(12) United States Patent  (10) Patent No.: US 8,076,016 B2
Baglino et al.  (45) Date of Patent: Dec. 13, 2011

(54) COMMON MODE VOLTAGE ENUMERATION IN A BATTERY PACK

(75) Inventors: Andrew Baglino, San Francisco, CA (US); Philip David Cole, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 114 days.

(21) Appl. No.: 12/498,280

(22) Filed: Jul. 6, 2009

(65) Prior Publication Data

US 2011/0004438 A1    Jan. 6, 2011

Related U.S. Application Data

(63) Continuation of application No. 12/498,251, filed on Jul. 6, 2009.

(51) Int. Cl.
*H01M 2/00* (2006.01)
*H01M 10/48* (2006.01)
*H01M 2/24* (2006.01)

(52) U.S. Cl. ............ 429/61; 429/90; 429/160; 700/293; 702/150

(58) Field of Classification Search .......... 429/122–347, 429/90, 61; 29/623.1–623.5; 700/293; 702/150
See application file for complete search history.

(56) References Cited

U.S. PATENT DOCUMENTS

| 5,710,503 | A | * | 1/1998 | Sideris et al. | 324/431 |
| 6,104,967 | A | * | 8/2000 | Hagen et al. | 700/293 |
| 7,269,525 | B1 | * | 9/2007 | Gough et al. | 702/81 |

OTHER PUBLICATIONS

Baglino et al., U.S. Appl. No. 12/498,251, filed Jul. 6, 2009.*

* cited by examiner

*Primary Examiner* — Basia Ridley
*Assistant Examiner* — Jonathan G Leong
(74) *Attorney, Agent, or Firm* — Patent Law Offices of Michael E. Woods; Michael E. Woods

(57) ABSTRACT

An apparatus and method for these embodiments of the present invention, useful in manufacturing for example, includes a plurality of battery modules serially intercoupled together, each module including a housing with an anode connector and a cathode connector, each housing including a memory for storing a module identifier and wherein an anode connector of a first module is coupled to a cathode connector of a second module; and a processing system, coupled to each the module, for determining a plurality of positional attributes of each the module, one positional attribute associated with each the module of the plurality of modules, the processing system writing an ID into the memory of each particular module responsive to the associated positional attribute for the particular module.

11 Claims, 2 Drawing Sheets

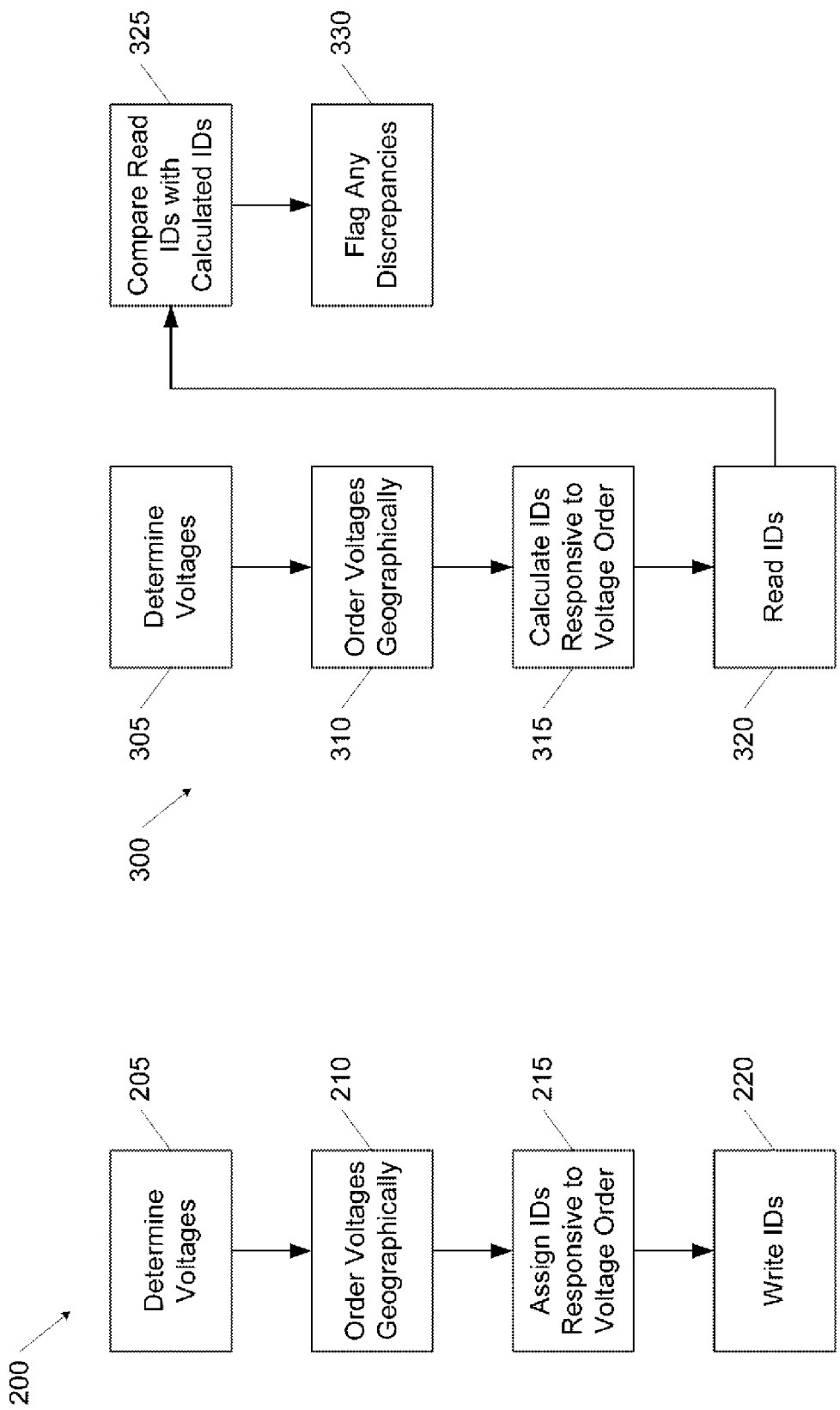

COMMON MODE VOLTAGE ENUMERATION IN A BATTERY PACK

BACKGROUND OF THE INVENTION

The invention relates generally to battery packs for electric vehicles and industrial applications, and more specifically to improvements in intelligent battery packs for simplifying manufacturing and detection of battery pack condition during operation.

Commercial grade high performance battery packs are commonly assembled from individual cells packaged into modules. There is typically some type of on-board intelligence incorporated into individual modules to monitor and control particular operational characteristics of each module, and collectively of the battery pack. This intelligence may be quite rudimentary, or quite sophisticated, based upon needs. Depending upon battery chemistry and application among other factors, various data are gathered by a battery monitoring system.

For enhancing safety and performance, it is preferred that monitoring be performed in real-time. Important information is collected by the on-board intelligence and gathered by the battery monitoring system from the individual modules. The individual modules are uniquely identified and addressed during the monitoring process.

Current manufacturing of battery packs includes serial interconnection of the several modules making up the particular battery pack. There are advantages in manufacturing and maintenance in knowing the geographic location of a particular module in the battery pack. In some applications, the individual modules are distributed throughout the device and it is even more advantageous to know which particular module is which and where it is physically located.

There are many prior art systems for uniquely identifying and addressing specific devices like the modules. Some of these systems include unique codes incorporated into a module during manufacturing, other systems provide for DIP switches, jumpers, or other mechanical solution to set a desired address. There are prior art systems that use electrical systems to gate communication to a next device in a daisy-chain until that device is identified. These have downsides, particularly, a) they require daisy chain interface rather than a bussed interface, and b) they require additional circuitry to gate the communication signals to the next device, which may not be compatible with all communication interfaces due to impedance, voltage range, isolation requirements, and the like.

Such systems burden the manufacturing process with requirements for ensuring unique IDs, as well as mapping the IDs into the geographic chain of the final assembly. Errors in the manufacturing are possible and create difficulties in locating and correcting operational problems indicated by the on-board intelligence. It can be difficult, if at all possible, to disambiguate modules in the event that non-unique IDs have been used. Locating and servicing a module from among many modules, modules that may be distributed geographically, that has been improperly mapped in the geographic string may unduly negatively impact the quality and efficiency of the servicing process.

What is needed is a module enumeration system that does not unduly burden manufacturing or restrict electrical and module interconnect design due to drawbacks with existing designs as discussed above.

BRIEF SUMMARY OF THE INVENTION

The present invention provides for a module enumeration system that does not unduly burden manufacturing or restrict electrical and module interconnect design due to drawbacks with existing designs. The system and method provide for automatically, dynamically, and efficiently assigning unique IDs to the individual modules of the battery pack while accurately geographically mapping them in the battery pack. The preferred implementation uses a dynamic measurement of one or more positional attributes of said plurality of battery modules, and then using the positional attribute(s) to assign a unique ID (e.g., an address) to each battery module. This address, once dynamically assigned, remains statically fixed based upon the positional attributes. One example of a positional attribute is a common mode voltage of each module when serially electrically intercoupled with the other modules. In some implementations, the positional attributes include additional geographic attributes such as where the particular module is physically installed (e.g., behind the glove compartment or in the trunk). This solution offers advantages in both manufacturing and monitoring/servicing of the battery pack. Manufacturing is able to assign a reference (e.g., the unique ID) to the manufactured pack by determining dynamically across all the modules to determine all the positional attributes and then assigning the IDs based upon an ordering of the positional attributes. This makes manufacturing much easier.

Monitoring/servicing may use embodiments of the present invention by determining a current (real-time) positional attribute of a module and then comparing it to a reference positional attribute of that module. The reference positional attribute is implied by the ID associated with the module as it was dynamically assigned based upon a positional attribute available at manufacture/installation. The reference positional attribute may thus be derived from the ID. When the current positional attribute has a predetermined relationship to the reference positional attribute (e.g., a mismatch) then the module is flagged. Further management, monitoring, servicing may be desired to address a condition resulting in the flagged predetermined relationship. The monitoring is dynamic and may implemented continually in real-time or periodically as desired.

Disclosed is an apparatus and method for these embodiments of the present invention. An apparatus, useful in manufacturing for example, includes a plurality of battery modules serially intercoupled together, each module including a housing with an anode connector and a cathode connector, each housing including a memory for storing a module identifier (ID) and wherein the anode connector of a first module is coupled to the cathode connector of a second module; and a processing system, coupled to each module, for determining a plurality of positional attributes of each module, one positional attribute associated with each module of the plurality of modules, the processing system writing the ID into the memory of each particular module responsive to the associated positional attribute for the particular module.

A method, useful for manufacturing for example, includes (a) determining a plurality of positional attributes across a plurality of serially intercoupled battery modules, each of the modules including a memory for storing a module identifier (ID); and (b) writing the ID into the memory of each particular module responsive to the associated positional attribute for the particular module.

An apparatus, useful for monitoring/servicing for example, includes a plurality of battery modules serially intercoupled together, each module including a housing with an anode connector and a cathode connector, wherein an anode connector of a first module is coupled to a cathode connector of a second module, and wherein each module includes a reference developed from a determination of a reference positional attribute of the plurality of modules; a processing system, coupled to each module, for determining a plurality of current positional attributes for the plurality of battery modules, one current positional attribute associated with each module of the plurality of modules; a comparator, coupled to the processing system, for comparing a reference positional attribute for a particular reference associated with a particular one battery module to the current positional attribute of the particular one battery module; and a monitor, coupled to the comparator, for flagging the particular one battery module when a predetermined relationship exists between the reference positional attribute and the current positional attribute.

A method, useful for monitoring/servicing for example, includes (a) determining dynamically a plurality of current positional attributes across a plurality of serially intercoupled battery modules; and (b) comparing, for a particular one of modules, the current positional attribute with a predetermined reference developed from a dynamic determination of a reference positional attribute of the plurality of modules; and (c) flagging the particular one battery module when a predetermined relationship exists between the reference positional attribute and the current positional attribute.

Module identification is important when a battery pack is in operation for a number of reasons including: 1) It helps associate measured data with a physical location within the battery pack; 2) It informs service personnel which module to replace in case of a identified problem within the battery pack; and 3) It facilitates addressing within communication schemes. The present invention provides a dynamic identification solution to assignment of static module identifiers, along with attendant benefits derived from this implementation including dynamic service value.

BRIEF DESCRIPTION OF THE DRAWINGS

FIG. 2 is a flowchart of an ID assignment determination process;
and
FIG. 3 is a flowchart of an ID confirmation determination process.

DETAILED DESCRIPTION OF THE INVENTION

Figure 1:
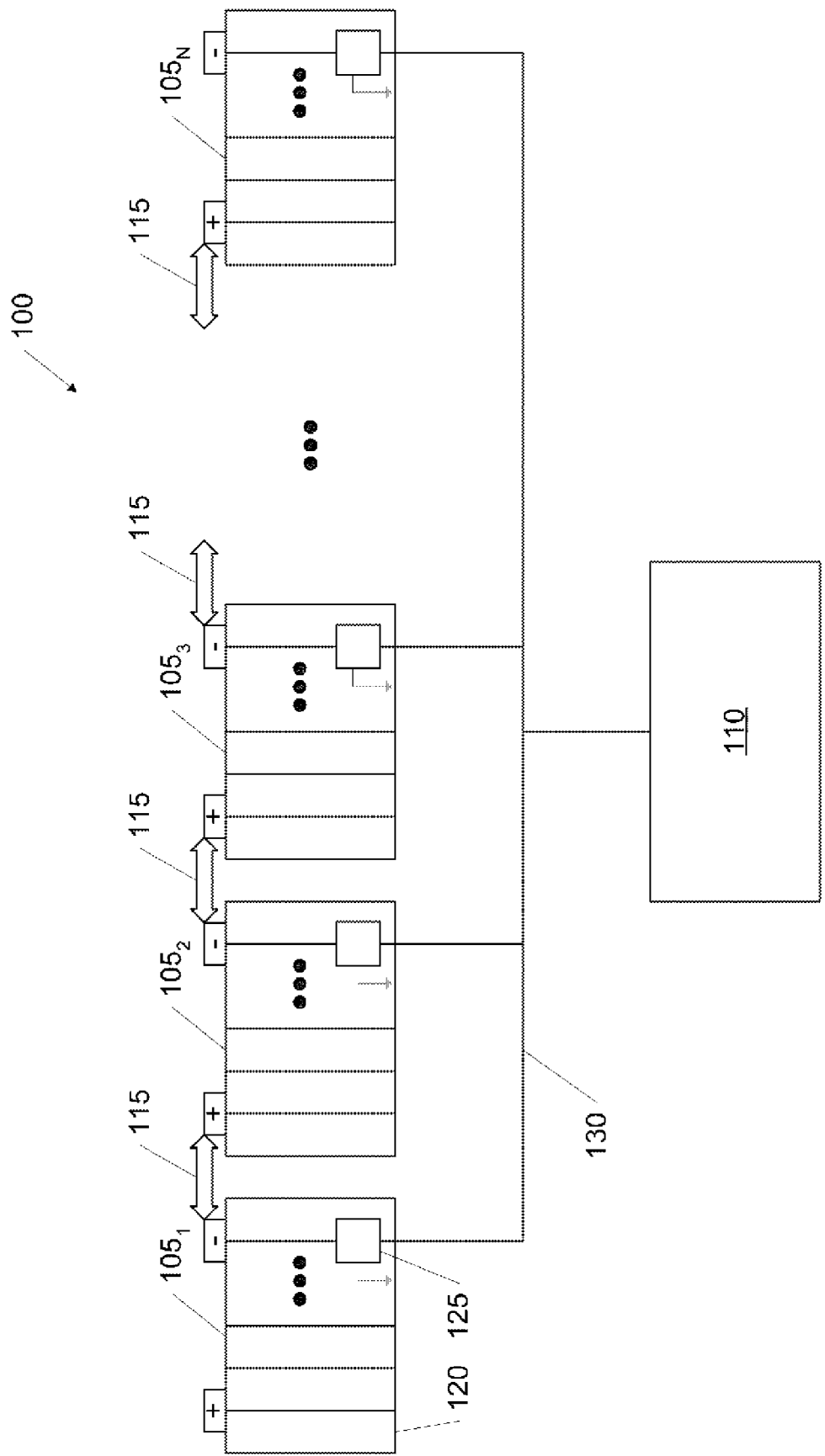
FIG. 1 is a schematic diagram of a battery assembly according to the present invention.

The present invention relates to battery packs for heavy application, such as for electric passenger vehicles and industrial application. For example, the present invention may be used in a Tesla Motors' Roadster or Model S sedan. While applicable to many heavy uses, the implementation in a battery pack is described in detail below for making the invention easier to understand by reference to a specific example. In the following description, numerous specific details are set forth in order to provide a thorough understanding of the present invention. It will be apparent, however, to one skilled in the art, that the present invention may be practiced without some or all of these specified details and may be applied to any battery pack assembly for example. In some instances, well known process steps of determining/measuring common mode voltages have not been described in detail in order to not unnecessarily obscure the present invention.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

FIG. 1 is a schematic diagram of a battery assembly 100 according to the present invention. Battery assembly 100 includes a plurality of serially coupled battery modules $105_i$ and a battery monitoring system 110 coupled to each battery module $105_i$. A connector 115 couples an anode of battery module $105_i$ to a cathode of battery module $105_{i+1}$.

Connector 115 is an electrical coupler and may be implemented in any of several ways, including a fuse, electrical conductor, direct connection, or the like.

Particular specific details of the construction and assembly of a battery module vary according to application and chemistry, so the following description is provided as one of many possible implementations. Each battery module $105_i$ includes a housing having a collection of individual lithium-ion cells 120 (individually or in subassemblies). Each module $105_i$ also includes a processing sub-system 125, specific to application and battery chemistry, for acquiring and reporting data. Processing sub-system includes a memory for saving/storing desired information. The data that is collected and reported may include performance, status, and other information for enhancing safety, operation, and maintenance of the modules $105_i$ and battery assembly 100.

A network 130 couples each processing sub-system 125 to battery monitoring system 110. Network 130 is shown as a one-to-many wired coupling of battery monitoring system 110 to each processing sub-system 125 though other implementations are possible including wireless parallel coupling, a ring coupling, or a hybrid combination.

Each processing sub-system 125 may be implemented as a microcomputer solution having a microcontroller/microprocessor and memory or it may be more rudimentary combinatorial logic for monitoring desired data or state information within each module 105i. However implemented, each processing sub-system 125 includes an identifier (ID) that serves as a unique address in battery assembly 100. There are many addressing systems that may be used, the present invention dynamically assigns each ID and writes it, during the manufacturing/installation phase, into processing sub-system 125. The dynamic assignment of the static ID is made in such a way that the assigned IDs reflect positional/geographic positioning (e.g., the positional/geographic information may be relative, absolute, or include some of both characteristics).

For purposes of the present discussion, the term positional attribute includes a determinable ordering characteristic of the module when installed into a pack having two or more modules. The positional attribute may indicate relative or absolute ordering of a serial coupling of the modules. In the preferred embodiment, a positional attribute includes a common mode voltage of each module. In some instances, geographic positioning is also desired and refers to a specific physical location of a particular battery module $105_x$ (either relative or absolute) in the series couplings of modules $105_i$. In some applications, it may be preferred to use some other positional attribute besides common mode voltage, or in addition to common mode voltage.

Depending upon the specific application, it may be useful to know that a module with a particular ID is the $N^{th}$ module from a particular end of the series coupling. In some implementations, battery modules are distributed in various locations in the vehicle or machine. For example, it may be that the $N^{th}$ module $125_N$ is located behind the glove compartment. By knowing a particular ID, and knowing that the particular ID is assigned to module $125_N$, and that the $N^{th}$ module is located in the glove compartment, it is easy for a user to determine that the particular module with that particular ID is behind the glove compartment. These are included in the definition of positional attribute and geographic location terms.

This is in contrast to conventional systems which provide for manufacturing to set the ID, using jumpers, DIP switches, software, or the like. It is a drawback that the settings may not be set properly to reflect the desired ID to be assigned, or that the assigned ID will not be absolutely or relatively unique. Absolutely unique refers to a unique ID that is not matched across any batter pack assembly (or set of such assemblies), while relatively unique refers to an ID not matched within a battery pack. Even in the event that the intended ID assignment is made and that assignment is unique, manufacturing would still need to create a manual mapping of the geographic location of the modules when this feature is desired. This manual mapping lends itself to the potential for mis-mapping which may be, in some cases, worse than no mapping. And the manual mapping adds additional effort and cost, so it may not be implemented even when it is otherwise useful.

In the preferred embodiment, the dynamic assignment is made by using a common mode voltage of each battery module $105_i$ determined relative to a ground that is common to the modules. The more robust the ground, the better the determined common mode voltages will accurately reflect the positional attributes. In a series coupling of uniform battery modules, when the voltage across a battery pack varies from $+V_{bat}/2$ to $-V_{bat}/2$, the common mode voltage at each module is an incremental change over the battery voltage range.

A common situation in the art of network communications is arbitration of various network events. In the present context, one particular event is the dynamic assignment of the static reference IDs across all the modules upon assembly (manufacture) of the battery pack. As noted herein, each module is dynamically assigned an address, but upon power-up, each module has an undefined (or pre-defined) ID that could lead to collisions on the network bus. There are many ways of potentially resolving these conflicts upon power-up to permit the dynamic assignment of reference IDs based upon the real measured positional attributes.

The preferred embodiments provide for a varying power-up delay of each module when the assembled battery pack is powered. The particular delay is a function of the positional attribute. That is, in the case when the positional attribute is a common mode voltage, the delay of each module is responsive to the particular common mode voltage. A "first" (e.g., one with the highest or lowest voltage) module is powered up, has its reference ID determined and assigned. A "second" module is next powered up. The process continues until all modules have been powered up and received a reference ID.

FIG. 2 is a flowchart of an ID assignment process 200. Process 200 is a preferred embodiment for dynamically assigning the static reference IDs. Step 205 of process 200 determines (e.g., measures) positional attributes (e.g., the common mode voltages) across modules $105_i$ of battery system 100. Next, step 210 of process 200 orders the determined common mode voltages in a positional/geographic order. The geographic order, in the preferred embodiment, geographically orders voltage (and its associated module) starting at one "end" of the series coupling in increasing (or decreasing) order. The above-described process of powering up the modules in an order determined by positional attributes (e.g., the common mode voltages) is one way of determine positional attributes and ordering them. Other solutions are possible and may be used in addition to or in lieu of the solutions described herein.

Next, step 215 of process 200 assigns an ID to each module responsive to the ordered determined common mode voltages. For example, battery module $125_1$ (e.g., the battery module with the lowest common mode voltage) is assigned $ID_1$. Next at step 220, process 200 writes the assigned IDs into processing sub-system 125. These static IDs are dynamically assigned, and assigned after the modules have been coupled and, in some cases, after installation.

When the IDs are dynamically derivable based upon positional attributes and/or geographic position, another aspect of the present invention is available to users. Particularly available to monitoring and servicing users. For example, there are conditions of battery modules 105, connectors 115, and of battery system 100, that may alter a post-manufacture/post-install determination of common mode voltages. Should a module fail or have other electrical connection problems, or a connector fail, in particular ways, the measured common mode voltages of a battery system 100 is compared to the assigned ID in the module chain. The common mode voltages are continually monitored by the module monitors, during service and during operation (they may, of course, be periodically monitored as well). When the comparison of the current common mode voltage differs from common mode voltage implied by the associated reference ID, then there may be a situation that needs resolution.

It is one use of this aspect of the invention that an installation confirmation test may be made to determine whether determined positional attributes (e.g. common mode voltages) determined at an assembly time are different from common mode voltages determined after battery system 100 is installed. A difference may reflect a mis-installation that is corrected earlier in the manufacturing process. Module monitors may run a post-installation check (for monitoring/diagnostic) or during servicing as the common mode voltages are always available. A battery module that has a common mode voltage different from what it had during manufacturing/installation may indicate a potential problem. Because the original static reference ID was dynamically assigned based upon geographic positioning, it is a simple matter for manufacturing to focus additional diagnostic/trouble-shooting on the suspect battery module.

FIG. 3 is a flowchart of an ID confirmation determination process 300. Process 300 is a preferred embodiment for dynamically evaluating the battery modules of a battery pack. For example, the process may use the dynamically determined static IDs for detection of possible flagged conditions. Step 305 of process 300 determines (e.g., measures) the common mode voltages across modules $105_i$ of battery system 100. Next, step 310 of process 300 orders the determined common mode voltages in a geographic order based upon positional attributes (e.g., common mode voltages). The geographic order, in the preferred embodiment, geographically orders voltage (and its associated module) starting at one "end" of the series coupling in increasing (or decreasing) order. The above-described process of powering up the modules in an order determined by positional attributes (e.g., the common mode voltages) is one way of determine positional attributes and ordering them. Other solutions are possible and may be used in addition to or in lieu of the solutions described herein.

Next, step 315 of process 300 implies an expected ID for each module responsive to the ordered determined positional attributes (common mode voltages). For example, battery module $125_1$ (e.g., the battery module with the lowest common mode voltage) is determined that it should have $ID_1$. Next at step 320, process 200 reads the stored IDs from the memory of processing sub-system 125. These stored IDs were dynamically assigned, and assigned after the modules had been serially electrically coupled and, in some cases, after installation of the pack (and individual modules of the assembled pack).

Step 325 compares the measured positional attribute with an implied positional attribute derived from the reference ID and step 330 flags any discrepancies from comparison step 325. (This could be done as well by implying a current ID from the current positional attribute and comparing the implied ID with the reference ID.) A discrepancy may indicate a short, an open, or other condition affecting the determined positional attribute (e.g., the common mode voltages). Flagging is performed when the current positional attribute has a predetermined relationship to the a reference positional attribute (e.g., a mis-match). Thus, these discrepancies could indicate a reason for additional diagnostic, servicing, maintenance, or other operation including deactivation of any potentially misbehaving battery module.

The system, method, and computer program product described in this application are embodied in hardware; e.g., within or coupled to a Central Processing Unit ("CPU"), microprocessor, microcontroller, System on Chip ("SOC"), or any other programmable device. Additionally, the system, method, and computer program product may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets, virtual private networks and/or local area networks. A system, method, and computer program product embodied in software may be included in a semiconductor intellectual property core (e.g., embodied in HDL) and transformed to hardware in the production of integrated circuits. Additionally, a system, method, and computer program product as described herein may be embodied as a combination of hardware and software, e.g., CPU, PROM, ROM, RAM and the like.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program, or expanded content including dynamic information including score, performance, grade, bookmark features, instructions (all or a portion thereof) for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus, comprising:
   a plurality of battery modules serially intercoupled together, each module including a housing with an anode connector and a cathode connector, wherein an anode connector of a first module is coupled to a cathode connector of a second module, and wherein each said module includes a reference developed from a static measurement of a reference positional attribute of said plurality of modules wherein said reference positional attribute of each particular module identifies a particular reference location of said particular module in said serially intercoupled plurality of battery modules relative to other battery modules of said plurality of modules;
   a processing system, coupled to each said module, for determining a plurality of current positional attributes for said plurality of battery modules, one current positional attribute associated with each said module of said plurality of modules wherein said current positional attribute of each particular module identifies a particular current location of said particular module in said serially intercoupled plurality of battery modules relative to other battery modules of said plurality of modules;
   a comparator, coupled to said processing system, for comparing a reference positional attribute for a particular reference associated with a particular one battery module to said current positional attribute of said particular one battery module; and
   a monitor, coupled to said comparator, for flagging said particular one battery module when a predetermined relationship exists between said reference positional attribute and said current positional attribute wherein existence of said predetermined relationship indicates that said particular current location of said particular one module is different from said particular reference location.

2. The apparatus of claim 1 wherein said positional attribute includes a common mode voltage associated with each said module.

3. The apparatus of claim 2 wherein said reference includes an ID unique among IDs of said plurality of battery modules.

4. The apparatus of claim 3 wherein said positional attribute includes a geographic location reference of said particular module in said serial intercoupling.

5. The apparatus of claim 4 wherein said geographic location reference is determined based upon an ordering of said associated common mode voltages.

6. A method, the method comprising the steps of:
   (a) determining dynamically a plurality of current positional attributes for each of a plurality of serially intercoupled battery modules wherein said current positional attribute of a particular battery module identifies a particular current location of said particular battery module in said serially intercoupled plurality of battery modules relative to other battery modules of said plurality of modules; and
   (b) comparing, for a particular one of said plurality of modules, said current positional attribute with a predetermined reference developed from a dynamic determination of a reference positional attribute of said plurality of modules wherein said reference positional attribute of a particular battery module identifies a particular reference location of said particular battery module in said serially intercoupled plurality of battery modules relative to other battery modules of said plurality of modules; and
   (c) flagging said particular one battery module when a predetermined relationship exists between said reference positional attribute and said current positional attribute wherein existence of said predetermined relationship indicates that said particular current location of said particular one module is different from said particular reference location.

7. The method of claim 6 wherein said positional attribute includes a common mode voltage associated with each said module.

8. The method of claim 7 wherein said reference includes an ID unique among IDs of said plurality of battery modules.

9. The method of claim 8 wherein said positional attribute includes a geographic location reference of said particular module in said serial intercoupling.

10. The method of claim 9 wherein said geographic location reference is determined based upon an ordering of said associated common mode voltages.

11. A method, the method comprising the steps of:
    (a) determining dynamically a plurality of current positional attributes for each of a plurality of serially intercoupled battery modules after installation into a vehicle wherein said current positional attribute of a particular battery module identifies a particular current location of said particular battery module in said serially intercoupled plurality of battery modules in said vehicle relative to other battery modules of said plurality of modules; and
    (b) comparing, for a particular one of modules, said current positional attribute with a predetermined reference developed from a dynamic determination of a reference positional attribute of said plurality of modules wherein said reference positional attribute of a particular battery module identifies a particular reference location of said particular battery module in said serially intercoupled plurality of battery modules relative to other battery modules of said plurality of modules wherein said reference positional attribute was developed before said plurality of serially intercoupled battery modules were installed into said vehicle; and (c) flagging said particular one battery module when a predetermined relationship exists between said reference positional attribute and said current positional attribute wherein existence of said predetermined relationship indicates that said particular current location of said particular one module is different from said particular reference location.

\* \* \* \* \*